United States Patent [19]

Krumwiede

[11] 4,410,347

[45] * Oct. 18, 1983

[54] GLASS MELTING METHOD USING CULLET AS PARTICULATE COLLECTION MEDIUM

[75] Inventor: John F. Krumwiede, Indiana Township, Allegheny County, Pa.

[73] Assignee: PPG Industries, Inc., Pittsburgh, Pa.

[*] Notice: The portion of the term of this patent subsequent to Sep. 21, 1999 has been disclaimed.

[21] Appl. No.: 363,210

[22] Filed: Mar. 29, 1982

Related U.S. Application Data

[62] Division of Ser. No. 249,310, Mar. 31, 1981, Pat. No. 4,350,512.

[51] Int. Cl.$^3$ .............................................. C03B 1/00
[52] U.S. Cl. ......................................... 65/27; 65/28; 65/62; 65/134; 65/335; 165/111; 209/11; 209/47; 209/129
[58] Field of Search .................. 65/27, 28, 62, 134, 65/335; 165/111; 209/11, 45, 47, 129, 130, 133, 285

[56] References Cited

U.S. PATENT DOCUMENTS

| | | |
|---|---|---|
| 1,663,863 | 3/1928 | Royster et al. |
| 1,815,890 | 7/1931 | Brockway |
| 2,990,912 | 7/1961 | Cole .............................................. 183/7 |
| 3,549,135 | 12/1970 | Wynne et al. .......................... 263/15 |
| 3,726,697 | 4/1973 | Mod et al. ................................ 106/52 |
| 3,753,743 | 8/1973 | Kakuda et al. ......................... 106/52 |
| 3,788,832 | 1/1974 | Nesbitt et al. .......................... 65/134 |
| 3,880,629 | 4/1975 | Dulin et al. ............................... 65/27 |
| 3,880,639 | 4/1975 | Bodner et al. ......................... 65/134 |
| 3,953,190 | 4/1976 | Lange ..................................... 65/335 |
| 4,099,953 | 7/1978 | Rondeaux et al. .................... 65/335 |
| 4,126,435 | 11/1978 | Reese ..................................... 55/474 |
| 4,144,359 | 3/1979 | Zahedi et al. .......................... 427/39 |
| 4,252,551 | 2/1981 | Nishimura ............................... 65/28 |
| 4,350,512 | 9/1982 | Krumwiede ............................. 65/62 |

FOREIGN PATENT DOCUMENTS 54-33249 3/1974 Japan.

*Primary Examiner*—Arthur D. Kellogg
*Attorney, Agent, or Firm*—Dennis G. Millman

[57] ABSTRACT

In a glass melting operation, cullet is employed as a particulate emissions collector. Cullet of a selected size is contacted with exhaust gases in a gas/solid contact vessel wherein particulates are deposited onto the cullet. Double screening of cullet is employed to avoid introducing cullet dust to the gas stream. Electrostatic means may be employed to enhance particulate collection in the bed of cullet.

9 Claims, 3 Drawing Figures

GLASS MELTING METHOD USING CULLET AS PARTICULATE COLLECTION MEDIUM

This application is a division of U.S. application Ser. No. 249,310 filed Mar. 31, 1981, now U.S. Pat. No. 4,350,512.

BACKGROUND OF THE INVENTION

The present invention relates to recovery of waste heat and reduction of particulate emissions from a glass melting operation. The invention has particular utility in the melting of flat glass, but is applicable to any large-scale glass melting operation.

Commercial production of glass in a continuous melting furnace conventionally involves feeding raw glass batch materials into an opening at one end of an elongated melting furnace while withdrawing melted glass through an opening at the opposite end of the furnace and forming it into the desired product, such as a flat glass ribbon. Flat glass batches typically include sand (silica), soda ash (sodium carbonate), limestone (calcium carbonate), dolomite (calcium carbonate and magnesium carbonate), rouge (iron oxide), a source of sulfur such as salt cake, gypsum, slag, etc., and sometimes the raw materials aplite, feldspar, or nepheline syenite. It is also known to use caustic soda in place of soda ash. Minor amounts of additional materials such as colorants (e.g., iron oxide) may sometimes be used as well. These batch ingredients, in finely divided, dry, particulate form, are blended together and usually wetted with water (or caustic soda solution) prior to being introduced into the furnace. Additionally, a substantial amount of cullet (broken or crushed glass) is mixed with the batch ingredients, in amounts usually ranging from about 20% to about 60% of the total glassmaking materials being fed to the furnace.

When introduced to the high temperature conditions within the melting furnace, the raw ingredients undergo chemical reactions and dissolution which, in a continuous flat glass furnace, normally take place within the first half of the furnace or less. The remainder of the furnace is devoted to "fining" (or "refining") and conditioning the glass melt. The process of fining is the removal of gaseous products of reaction from the melt by providing conditions which cause the gas bubbles to rise to the surface and burst or to redissolve in the glass. In order to obtain adequate fining within a reasonable length of furnace, glassmakers, especially flat glass manufactures, have relied on the inclusion of substantial amounts of a sulfur source, usually salt cake (sodium sulfate), in the batch to speed the fining process. The salt cake also has other beneficial effects on the melting process.

Unfortunately, the use of sulfur compounds in the melting process is a major contributor to particulate emissions from a glass melting furnace. At glass melting temperatures sulfur compounds such as salt cake dissociate or volatilize, resulting in the emission of sulfur-containing gases which pass from the furnace in the exhaust gas stream. A portion of these sulfurous gases recombine with sodium vapor within the furance or exhaust passages to form particulate sodium sulfate which comprises the major portion of the particulate emissions from glass furnaces, particularly flat glass furnaces. In some localities, regulations as to maximum allowable particulate emission rates have restricted operations of some glass manufacturers. Many widely varying proposals for reducing particulate emissions from glass furnaces have been made in the prior art, but none is entirely satisfactory.

Perhaps the most straightforward approach to lowering the amount of particulate in glass furnace emissions is to treat the exhaust gas stream to remove the particulates such as by electrostatic precipitators or scrubbers. However, such approaches entail high capital and operating costs and return no improvement to the melting process. Accordingly, it has been suggested that the exhaust gas stream contact glass batch materials to strip particulates from the exhaust as well as preheat the batch materials so as to recover heat being lost in the exhaust gas stream. Examples of such an approach are disclosed in U.S. Pat. Nos. 3,726,697; 3,788,832; 3,880,639; and 3,953,190. The heat recovery of these proposals is a distinct advantage since a considerable amount of thermal energy is wasted in the exhaust gas even though glass furnaces conventionally employ heat recovering devices such as regenerators or recuperators. Furthermore, these proposals return the sulfate material to the melting process, thereby saving on batch costs.

Unfortunately, most arrangements for contacting batch materials with exhaust gas have two major drawbacks: the batch must be agglomerated, and the particulate removal efficiency is dependent on bed size. Agglomerating the batch, usually by pelletizing or briquetting, is required in order to prevent the fine batch materials from being entrained by the exhaust gas stream. However, the cost of agglomerating the batch can substantially reduce and even exceed the economic gain from the heat recovery. Also, it has been found that the use of agglomerated batch is not always successful at avoiding dusting since abrasion in a moving bed at high temperatures can cause the loss of fine material from the surfaces of the agglomerates. When these fine materials are entrained in the exhaust gas stream they contribute to the particulate emissions problem. Secondly, since beds of batch agglomerates remove particulates from the exhaust gas stream primarily by filtration, obtaining the desired degree of particulate removal can sometimes require undesirably large bed depths. A large bed depth is undesirable not only from the standpoint of equipment size, but more importantly, because of the accompanying high pressure drop which may require the use of additional blower means which likewise may substantially negate the economic advantages of heat recovery.

Preheating of loose glass batch material by contact with exhaust gases in fluidized beds has been proposed (e.g., U.S. Pat. No. 4,099,953). However, the resulting separation of fine materials from the relatively coarse materials of the batch and entrainment of the fine materials in the exhaust gas stream have been problems which have discouraged the use of such an approach to preheat glass batch.

In U.S. Pat. No. 3,753,743, there is disclosed a method of recovering waste heat from a glass furnace exhaust stream by passing the exhaust gas through a bed of cullet. The heated cullet is mixed with a caustic soda containing batch slurry in order to dry the slurry prior to feeding to the melting furnace. The patent includes no mention of particulate removal nor does it contemplate any use for heated cullet apart from the slurry drying function disclosed. It appears that little, if any, thermal benefit to the melting process is obtained by the method disclosed in the patent.

An arrangement is shown in U.S. Pat. No. 3,880,629 for returning collected particulates from a bag house to a glass melting furnace, but no attempt is made to recover waste heat.

Recovery of waste heat from glass furnace exhaust by conventional heat exchange technology has been economically unfavorable and hampered by the presence of particulates in the exhaust gas which leads to clogging.

The use of beds of electrostatically charged solids as the media for collecting particulates from gas streams is disclosed in U.S. Pat. Nos. 2,990,912; 4,126,435 and 4,144,359. None of these relates to glass melting processes nor do they deal with recovery of waste heat.

SUMMARY OF THE INVENTION

In the present invention, cullet is employed as a particulate collection medium. A portion or all of the exhaust gas stream from a glass melting furnace is passed through a bed or beds of cullet wherein particulates are entrapped. In preferred embodiments of the invention, the collection of particulates on the cullet is aided by electrostatic means, whereby an electrostatic charge is applied to particles in the exhaust gas and/or an electric field is imposed across the cullet bed. The cullet may be fed to the glass melting furnace to recycle the entrained particulates to the melting process.

In another aspect of the invention claimed in parent application Ser. No. 249,310 filed on Mar. 31, 1981, now U.S. Pat. No. 4,350,512, the cullet bed is employed to recover heat from the exhaust gas stream. The heated cullet is charged directly to the melting furnace to avoid heat losses. Preferably, the heated cullet is fed separately from the batch.

The use of cullet as the medium for recycling particulates and/or heat is advantageous in that cullet is ordinarily fed to glass melting furnaces in large quantities. Cullet is not as friable as agglomerated batch, thus avoiding dusting problems. And appropriately sized cullet can be provided relatively easily without the need for a major agglomerating facility. In many cases no modifications are required of existing batch mixing and feeding them.

Another aspect of the invention involves the use of a preferred particle size of cullet. The properly sized cullet may be obtained by screening available cullet. A particular feature that may be employed to minimize cullet dust is a double screening operation to remove fines from the cullet prior to use.

THE DRAWINGS

DETAILED DESCRIPTION

Figure 1:
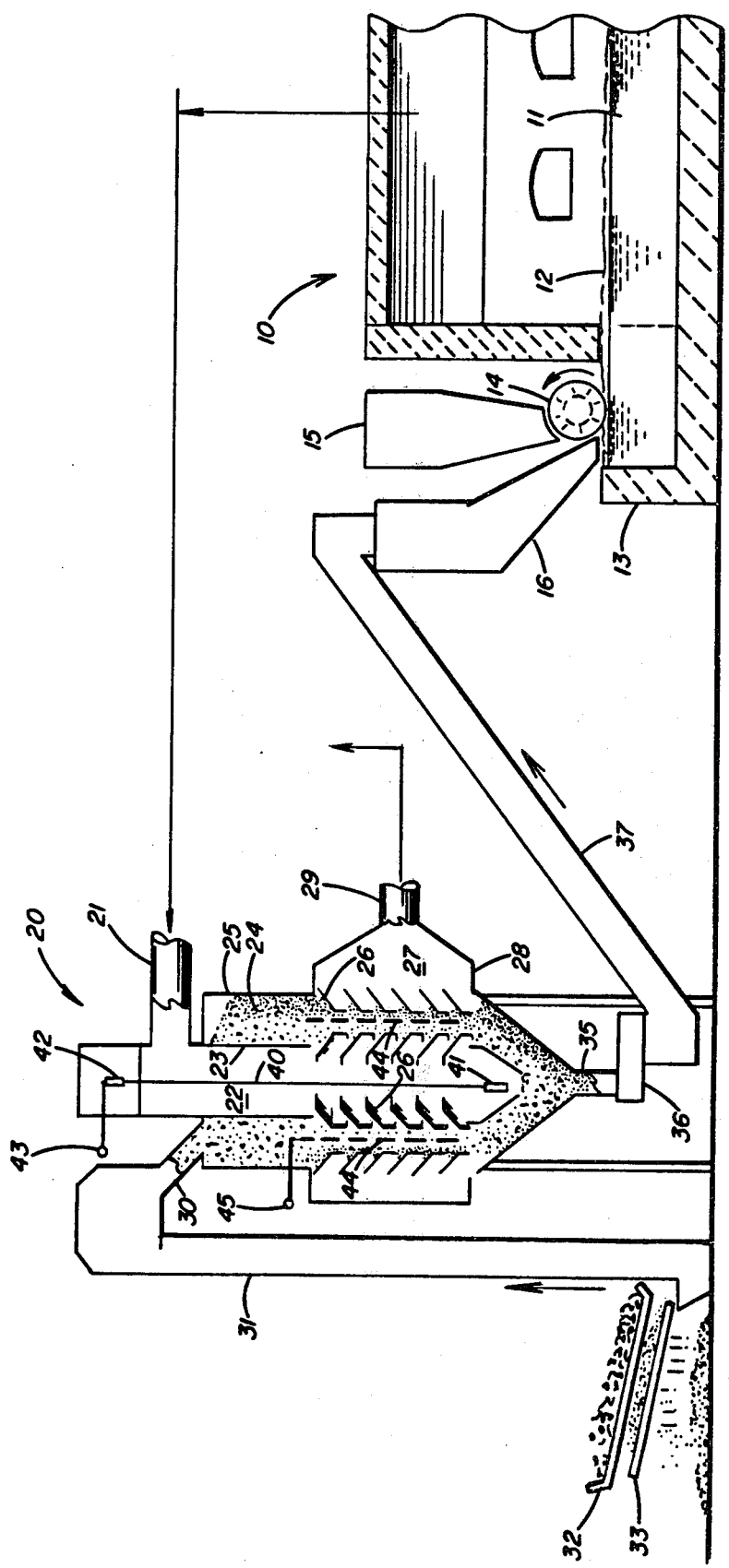
FIG. 1 is a schematic representation of a flat glass melting furnace shown in longitudinal cross-section being fed with particulate-laden, preheated cullet from a preferred embodiment of an exhaust gas/cullet contact vessel, also shown in cross-section.

In FIG. 1 there is shown in cross-section a schematic representation of a glass melting furnace 10. The type of furnace shown is that conventionally employed in the continuous melting of flat glass since it is contemplated that the invention will find its greatest utility in flat glass melting operations. However, it should be understood that the invention is applicable to the melting of other types of glass as well.

Within the melting furnace 10, there is contained a pool of molten glass 11. A layer of batch materials and cullet 12 is fed into the furnace from an inlet extension 13. Several types of feeder mechanisms are employed in the art and may be used with the present invention. Shown in the drawing is a conventional rotary type feeder 14, which is supplied with glass batch materials from a hopper 15 and cullet from a separate hopper 16. With such a feeder, the layer 12 is comprised of a layer of cullet beneath a layer of batch. This stratification of batch and cullet is desirable in connection with the present invention since it permits heated cullet to be fed into the furnace without interferring with the common practice of using wetted batch to prevent dusting. Also, it is preferred that the heated cullet be fed directly to the melting furnace rather than being mixed with the batch in order to minimize the time period during which heat may be lost from the preheated cullet.

The furnace 10 is depicted as a conventional, cross-fired, periodically reversing, regenerative furnace wherein a plurality of ports 17 are spaced along opposite side walls of the furnace. During one portion of the firing cycle, the ports along one side wall serve as burners while exhaust gases escape through the portions on the opposite side wall. The exhaust gases pass through the ports to a regenerator system (not shown) wherein heat from the exhaust gases is partially recovered by storage in a checker packing. From the regenerators the exhaust gases are conventionally passed to a smokestack. Considerable heat remains in the exhaust gas stream after it leaves the regenerators, exhaust gas temperatures in the range of 300° C. to 800° C. being typical. The exhaust gas temperature varies not only with the capacity and design of the regenerators, but also varies with time during each firing cycle.

In the present invention, as shown diagrammatically in FIG. 1, the exhaust gas from the furnace 10 is directed to a gas/solid contact vessel 20. A portion of, or the entire exhaust gas stream from the furnace may be directed to the vessel 20. The vessel 20 will be scaled in accordance with the volume flow rate of the exhaust gases, although at higher throughputs it becomes more efficient to employ additional vessels 20 rather than increase the size of one vessel. To treat the entire exhaust gas stream from a large scale, commercial flat glass furnace, a plurality of vessels 20 operating in parallel would be contemplated. The gas/solid contact vessel may take a variety of forms, but the annular vessel 20 is particularly suitable for use with the present invention and is a design commercially available from EFB, Inc., Woburn, Mass.

In the vessel shown in FIG. 1, the exhaust gas from the furnace enters the vessel 20 through a conduit 21 to an elongated interior space 22 within an inner cylinder 23. A bed of cullet 24 is held within the annular space between the inner cylinder 23 and an outer cylinder 25. Portions of cylinders 23 and 25 are comprised of louvers 26 opposite one another through which the exhaust gases may pass from the central space 22 through the annular bed of cullet 24 into a peripheral annular space 27 formed by a jacket 28. The gases may then pass from the vessel through a conduit 29 which may lead to a conventional smokestack or other means for discharging the exhaust gas to the atmosphere. Preferably, the pressure drop through the gas/solid contact vessel 20 is of sufficiently small magnitude to permit use of existing exhaust gas draft means. However, if a greater pressure drop is required, auxiliary draft fan or ejector means may be employed.

Cullet enters the top of the annular bed 24 through a chute 30 to which the cullet is lifted by means of a bucket elevator 31 or the like. Prior to being fed to the contact vessel 20 the cullet is screened to remove both fines and oversize pieces. A double vibrating screen may be employed wherein an upper screen 32 retains oversize pieces while a lower screen 33 passes fines. Cullet particles whose maximum dimensions lie in the range of about 2 millimeters to 40 millimeters have been found most suitable for use in the present invention. Finer particles can become entrained in the exhaust gas stream and larger particles tend to detrimentally decrease the density of the cullet bed in the contacting vessel and are prone to cause jam-ups. While the particle size range stated above is preferred, design precautions may be taken to permit larger or smaller sized cullet to be employed.

Cullet leaves the vessel 20 from the bottom through a conduit 35 to a vibratory feeder or screw conveyor 36 which serves to meter the rate of cullet passage through the vessel 20. The screw conveyor 36 empties into an inclined conveyor 37 that carries cullet to bin 16 feeding the melting furnace 10. In order to conserve the heat absorbed by the cullet, it is advantageous for the conveying means carrying cullet from the contact vessel 20 to the furnace to be insulated. This includes in particular the conveyor 37 and the bin 16. The vessel 20 may also be covered with a layer of insulation. Because thermal energy is supplied to the furnace by the pre-heated cullet, the fuel consumption for a given output of glass may be reduced. Conversely, the output of a furnace may be increased for a given amount of fuel consumption. Moreover, the efficiency of providing heat to the melting process by means of pre-heated feed materials is estimated to be about two to three times greater than that of heating by overhead firing. Therefore, every calorie recovered and returned to the furnace by the cullet results in a reduction of approximately two to three times the equivalent calorie's worth of fuel consumption. Yet another advantage is that providing heat in the feed materials themselves places the heat where it is most needed, and therefore, initial liquefaction of the feed materials takes place more rapidly.

From the standpoint of heat recovery, the cullet should be fed to the melting furnace at a temperature of at least 200° C. in order to make an appreciable impact on the efficiency of the furnace. In typical commercial glass melting operations, substantial quantities of exhaust gases at temperatures in the range of about 300° C. to 800° C. are available even after partial heat recovery in conventional regenerators. At typical feed rates of cullet to commercial glass melting furnaces, ample residence time can be provided in a contact vessel of the type shown in FIG. 1 to raise the cullet temperature above 200° C. and preferably above 300° C. As an example, with inlet exhaust gas temperatures of about 440° C., cullet temperatures at the outlet of the contact vessel can be expected to be about 375° C. As an upper limit the cullet should not be heated to a temperature at which the cullet particles would soften and stick to one another. This can occur around 600° C., and it is preferred the temperature of the cullet be maintained below this temperature until it is charged to the melting furnace. In general, in a glass melting furnace the amount of waste heat available in the exhaust gases is considerably in excess of the amount of heat required to raise the temperature of the normal flow rate of cullet to the maximum usable temperature.

In addition to recovering waste heat, the cullet bed 24 serves to remove particulate materials, especially particulate sulfates, from the exhaust gas stream. Subsequently, feeding the cullet to the melting furnace returns the particulate sulfates to the melting process, which not only economizes on batch costs, but also avoids disposal problems. The cullet bed itself can physically entrap a portion of the particulates, but for greater removal efficiencies it is preferred that particulate collection be electrostatically enhanced. The electrostatic means may include two separate features: a corona discharge device in the incoming gas stream, and an electric field imposed across the bed of cullet. Each of these electrostatic means may be used independently to enhance particulate collection, but it is particularly advantageous to use both in combination.

In the embodiment shown in FIG. 1, the corona discharge device comprises a vertically extending wire or rod 40 tensioned at the bottom end by a weight 41 and engaged at the upper end by an insulator 42. The corona discharge device is connected by way of electrical connection 43 to a source of high voltage potential, e.g., on the order of 10,000 to 50,000 volts DC. Negative or positive polarity may be applied to the corona discharge, but negative polarity is preferred. The inner cylinder 23 and the louvers 26 are connected to ground so that an ionizing electric field is established between the corona discharge wire 40 and the surrounding elements of the contact vessel, whereby particulates in the incoming gas stream become electrically charged. It has been found that charging the particulates improves collection efficiency even when the cullet bed is not electrified.

The arrangement for imposing an electric field across the cullet bed 24 illustrated in FIG. 1 comprises a perforated electrode plate 44 which is in the form of a cylinder and is embedded within the annular cullet bed 24 in the region of the louvers 26. The electrode plate 44 is connected to a source of high potential voltage by way of electrical connection 45. The outer cylinder 25 and louvers 26 are connected to ground. The voltage applied to electrode plate 44 may be alternating current or direct current, although direct current is preferred, and may typically be on the order of about 5,000 to 10,000 volts. The electric field between the electrode plate 44 and the grounded louvers 26 polarizes the particles of cullet therebetween so as to produce positively and negatively charged regions at opposite ends of each cullet particle. These charged regions attract and retain the previously charged particulates in the gas stream passing through the cullet bed. Although the corona discharge device is preferably employed to charge the particulates, electrifying the cullet bed alone enhances particulate collection even without use of the corona discharge since particulates in a moving gas stream naturally possess some charge.

A particular feature of the invention relates to screening the cullet, not only to provide the proper particle size for the bed, but also to remove dust which has been found to be present at times in available cullet. This cullet dust can become entrained in the exhaust gas stream passing through the cullet bed, thereby diminishing the net reduction of particulates. Must of the cullet dust can be removed with the fines by means of a vibratory screen such as screen 33 in FIG. 1. But in some cases, particularly when a wide range of cullet particles are present in the available cullet, it has been found that a single screening for fines may be inadequate. Accordingly, in FIG. 2 there is depicted schematically a preferred arrangement for screening cullet in situations where cullet dust is a problem.

Figure 2:
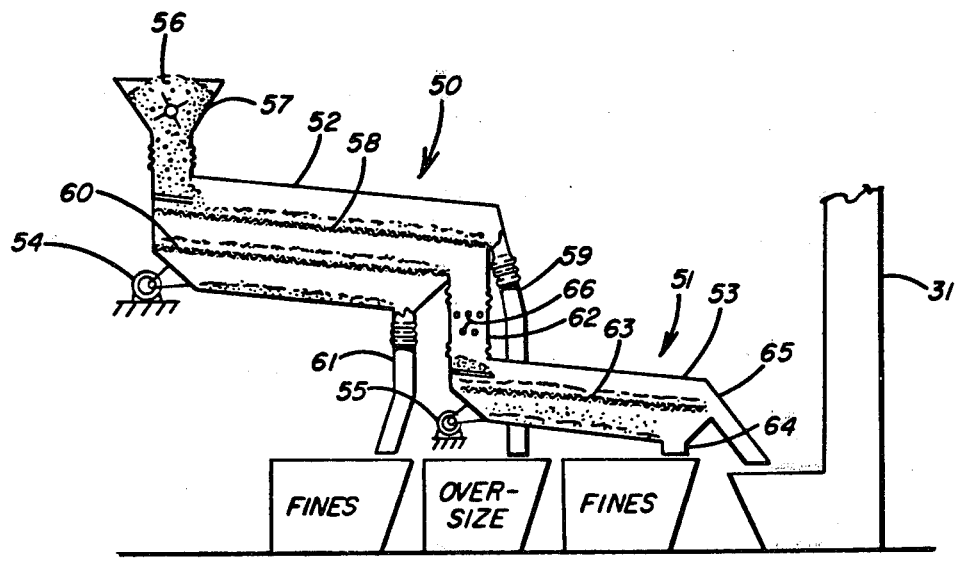
FIG. 2 is a cross-sectioned, schematic view of a double screening operation for processing cullet prior to use.

In general, the apparatus shown in FIG. 2 consists of two vibratory screen units 50 and 51 each enclosed in a housing 52 and 53 respectively. The housings may be vented to dust collecting means (not shown). Vibrators 54 and 55 are associated with each vibratory screen unit. Cullet 56 may be fed to the first vibratory screen unit 50 through a hopper 57 and is first screened for oversized particles on a large mesh screen 58. The oversize cullet pieces exit through a chute 59. Undersized cullet particles and cullet dust pass through fine mesh screen 60 and pass from the first vibratory screen unit through a chute 61. However, it has been found that the nature of some cullet does not permit complete separation of the fines and dust by the screen 60. This is because cullet includes flat pieces of glass on which fine particles rest in spite of the vibratory screening action. This problem is overcome by permitting the cullet to tumble through a vertical chute 62 to the second vibratory screen unit 51. The tumbling action of the cullet as it falls through chute 62 may be enhanced by means of horizontally extending rods 66 or other obstacles which may tend to agitate the falling cullet and dislodge the finer particles. The tumbling action tends to dislodge the finer particles which have previously been trapped on the larger pieces of cullet and are subsequently removed by screen 63. The fine particles are discharged through a chute 64. The clean, properly sized cullet passes through a chute 65 to the conveyor 31 to be conveyed to the gas/solid contact vessel 20.

Figure 3:
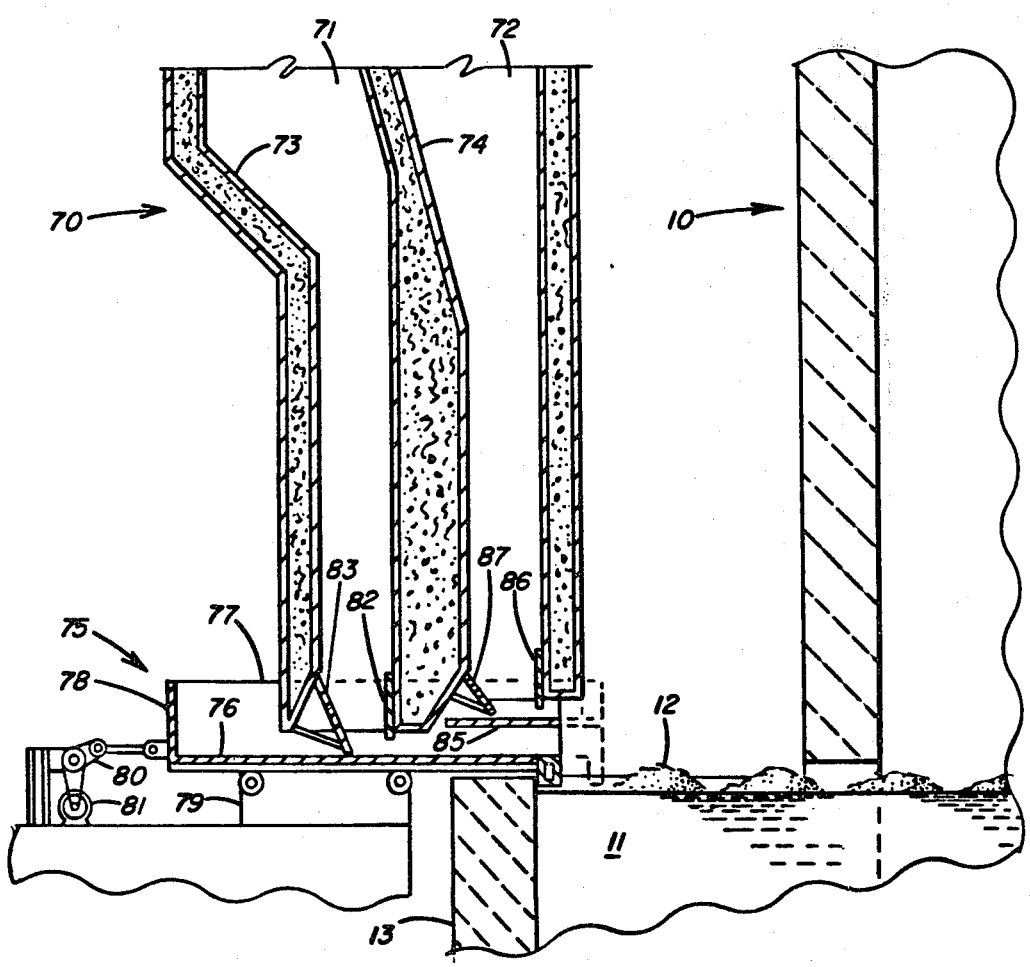
FIG. 3 is a cross-sectioned, schematic view of an embodiment of feeder for feeding batch and preheated cullet into a melting furnace.

Usually cullet is mixed with wetted glass batch prior to being charged to a glass melting furnace. However, when cullet has been preheated in accordance with the present invention, mixing the cullet with batch would be inadvisable because heat from the cullet would dry the wetted batch, thereby increasing the likelihood of dusting. Therefore, it is preferred that preheated cullet be fed to a melting furnace separately from the batch. A conventional rotary feeder such as feeder 14 shown in FIG. 1 is capable of accommodating two separate feed streams. However, another type of feeder commonly employed in glass melting furnaces is the reciprocating tray type feeder. This type of feeder is generally considered to be limited to feeding a single input stream. In FIG. 3 a modified reciprocating tray feeder arrangement is shown that is adapted to feed cullet and batch separately, thereby permitting the cullet preheating concepts of the present invention to be utilized on glass melting furnaces employing reciprocating tray type feeders.

The modified reciprocating feeder arrangement depicted in FIG. 3 includes a dual hopper 70 that includes separate feed chutes 71 and 72. Batch or cullet may be supplied to either of the chutes 71 or 72, depending upon whether the cullet is to be fed to the furnace beneath or on top of the batch layer. Both the exterior walls 73 of the hopper and the partition wall 74 between the chutes are fabricated of double steel walls filled with insulation to minimize heat loss from the preheated cullet. A reciprocating tray 75 is conventionally constructed of a bottom tray 76, side walls 77, and a back wall 78. The tray rides on a carriage 79 and is provided with reciprocation in a generally horizontal direction, for example by means of an eccentric 80 driven by a motor 81, all of which are conventional in the art. Metering of the material from chute 71 onto the bottom tray 76 is effected by means of a vertically adjustable flow control gate 82. As the feeder tray moves forward toward the melting furnace, a layer of material is deposited onto the lower tray at a specific depth determined by the gate 82. On the return stroke of the tray, an angled scraper blade 83, whose lower edge is closely adjacent to the upper surface of the lower tray 76, forces the feed materials to slide off the forward edge of the tray and into the pool of molten glass 11.

In order to feed cullet and batch separately, the reciprocating tray shown in FIG. 3 is provided with an upper tray 85 spaced above the forward portion of the lower tray 76 and underlying chute 72. The upper tray 85 cooperates with a flow control gate 86 and a scraper blade 87, which function in the same manner as gate 82 and scraper 83 previously described, to feed the material from chute 72 into the melting furnace. When the material is forced off the front edge of the upper tray 85, it is deposited onto the layer of material discharged from the lower tray 76, thereby forming a stratified charge of batch and cullet floating on the surface of the pool of molten glass 11. The forward stroke of the feeder also causes previously deposited batch and cullet to be pushed forwardly into the melting furnace.

In addition to the specific modes of operation described, it should be understood that the present invention is capable of operating in various other modes and combinations. For example, the gas/solid contact vessel 20 may be used in a nonelectrified mode for the sake of primarily preheating cullet and at the same time may serve to prefilter particulates from the exhaust gas. The exhaust gas subsequently may be passed to a separate particulate removal facility, which may be any conventional apparatus such as an electrostatic precipitator, a bag house, or an electrified moving bed arrangement of the same type as vessel 20. Such an arrangement may be advantageous since prefiltering a substantial portion of the particulates from the exhaust gas stream reduces the load on the subsequent particulate removal facility which may then be of reduced size and have reduced operating costs. At the same time, the cullet in the prefilter bed may be moved at a higher flow rate, and the prefilter bed may be of smaller size than if it were the sole particulate removal filtering means.

Frequently two or more glass melting furnaces are located side-by-side, in which case another mode of carrying out the present invention may involve interacting with a plurality of melting furnaces. In a single gas/solid contact vessel, exhaust gas from a single melting furnace may be brought into contact with cullet being supplied to a plurality of melting furnaces. In this manner, a greater portion of the waste heat and particulates from one melting furnace can be recovered due to the larger mass of cullet available to be contacted by the exhaust gas stream. Exhaust gas from the other furnace or furnaces may be subjected to independent heat recovery and/or particulate removal processes. For example, the exhaust gases from the remaining furnace may be passed to a moving bed filter (preferably electrified) of the type employed in the present invention in which the collection medium is an inert, recycled granular material such as gravel.

Other variations and modifications as are known in the art may be resorted to within the scope of the invention set forth in the claims which follow.

I claim:

1. A method of melting glass in a furnace from which is discharged an exhaust gas stream that includes particulate materials, comprising: classifying cullet to consist essentially of cullet particles each of whose maximum dimension is at least 2 millimeters and no greater than 40 millimeters by subjecting the cullet to a first vibratory screening operation and transferring and subjecting the cullet to a second screening operation; passing a stream of the exhaust gas prior to discharge to the atmosphere through a bed of the classified cullet, thereby depositing at least some of the particulate materials on the cullet; and feeding the cullet with the deposited materials thereon into the melting furnace.

2. The method of claim 1 wherein the cullet is subjected to a tumbling action intermediate the two screenings for fines removal.

3. The method of claim 1 wherein the particulate materials in the exhaust gas stream are subjected to electrostatic forces to enhance their deposition in the bed of cullet.

4. The method of claim 3 wherein the electrostatic forces include a corona discharge to which the exhaust gas stream is subjected prior to passing through the bed of cullet.

5. The method of claim 3 wherein the electrostatic forces comprise an electric field applied across the bed of cullet.

6. The method of claim 1 wherein fresh cullet is continuously added to the bed of cullet and cullet with deposited material is continuously removed from the bed of cullet.

7. The method of claim 1 wherein the exhaust gas stream, after passing through the bed of cullet, is subjected to a second particulate removal operation.

8. The method of claim 7 wherein the second particulate removal operation includes applying electrostatic forces to the particulates.

9. The method of claim 8 wherein the particulates are collected in a moving bed of granules.

* * * * *